United States Patent [19]

Wolde-Michael

[11] Patent Number: 4,515,607
[45] Date of Patent: May 7, 1985

[54] GAS, FLUID AND MINERAL SOLIDS SEPARATION AND RECLAMATION SYSTEM

[75] Inventor: Girma Wolde-Michael, Little Canada, Minn.

[73] Assignee: Donaldson Company, Inc., Minneapolis, Minn.

[21] Appl. No.: 600,348

[22] Filed: Apr. 13, 1984

[51] Int. Cl.³ .................... B01D 19/00; E21B 21/06
[52] U.S. Cl. .................................. 55/166; 55/174; 175/66; 175/206; 210/97; 210/298; 210/526
[58] Field of Search ................. 55/164, 166, 174, 176; 175/66, 206; 210/188, 295, 297, 298, 320, 312, 313, 333.1, 97, 519, 520, 522, 526

[56] References Cited

U.S. PATENT DOCUMENTS

| | | | |
|---|---|---|---|
| 1,999,291 | 4/1935 | Gouldbourn et al. | 51/135 |
| 2,118,157 | 5/1938 | Camp | 210/55 |
| 2,555,314 | 6/1951 | Buckley et al. | 255/24 |
| 2,887,228 | 5/1959 | Harlan et al. | 210/298 |
| 2,941,783 | 6/1960 | Stinson | 255/1 |
| 2,999,597 | 9/1961 | Harms | 210/333 |
| 3,498,461 | 3/1970 | Miller | 210/253 |
| 3,672,127 | 6/1972 | Mayse et al. | 55/174 |
| 3,706,384 | 12/1972 | Weijman-Hane | 210/519 |
| 4,110,218 | 8/1978 | Maniott et al. | 210/297 X |
| 4,247,312 | 1/1981 | Thakur et al. | 55/166 |
| 4,366,058 | 12/1982 | Wolde-Michael | 210/519 |
| 4,421,645 | 12/1983 | Creps et al. | 210/526 X |
| 4,422,931 | 12/1983 | Wolde-Michael | 210/168 |

OTHER PUBLICATIONS

Thakur and Poundstone, "Horizontal Drilling Technology for Advanced Degasification", Mining Engineering, Jun. 1980.
Shields, "Degasification Takes A Profitable Direction", Coal Mining and Processing, Jun. 1980.
Two articles from an Aug. 1982, Issue of Chemical Engineering.

Primary Examiner—Charles Hart
Attorney, Agent, or Firm—Merchant, Gould, Smith, Edell, Welter & Schmidt

[57] ABSTRACT

The invention is a system which separates and reclaims a gas, e.g. methane, an aqueous fluid, e.g. water, and solids, e.g. coal from a slurry mixture. One application of the invention is in the degasification operations of underground mining. The system is hermetically constructed for the safe separation, collection and reclamation of the various components of the mixture. Included in the structure of the system are a substantially airtight enclosure (10) which contains a trough-like passageway (20) for delivering the mixture into the enclosure (10), gas vents (25) and a collection manifold (26) for collecting the released gas; a filter assembly (42) for clarifying the aqueous fluid and reclaiming the fluid from the system for reuse, solids removal mechanisms for continuously transporting separated, settled solids from the enclosure interior (19) to a location exterior to the system, a dual-functional mechanism (62,65) for supplying make-up water to the system, a mechanism (67,68) for controlling the supply of the make-up water, a dual-functional skimmer mechanism (80), an emergency outlet (86) for releasing the mixture from the enclosure, and a mechanism (87,88,90,92) for closing the emergency outlet (86) during normal operation of the system and opening the outlet when necessary to accommodate high flows of mixture within the enclosure.

10 Claims, 9 Drawing Figures

GAS, FLUID AND MINERAL SOLIDS SEPARATION AND RECLAMATION SYSTEM

TECHNICAL FIELD

The present invention relates to systems for separating and reclaiming components within a mixture and in particular to a system for separating a gas, e.g. methane; a fluid, e.g. water; and mineral solids e.g. coal, from a slurry mixture within a hermetic environment and reclaiming the separated components apart from each other.

BACKGROUND

It has been known for some time that certain mining operations cannot be safely carried out without first reducing the high concentrations of methane gas. Research efforts have led to various methods for venting the gas ahead of the actual mining operation; a process commonly referred to as degasification. Typically, horizontal holes are drilled into the coal seam to provide vent areas for the methane to escape from the seam and thereby degasify the unmined coal. Such drilling operations occur thousands of feet below ground level with hydraulic powered drilling machines and related equipment which supply the power and water to the drill head. For many reasons it is desirable to reclaim and recirculate the water used in the drilling operation. Water used to flush the cuttings from the drilled hole, however, must first be clarified of methane, as well as the cuttings, before it can be reused.

Not until recently has the industry's interest in harvesting the methane gas for commercial purposes been sufficient to warrant significant research and development in the area to which the present invention is directed. As will be realized from the following disclosure of the preferred embodiment of the present invention, the invention provides the industry with a closed system capable of efficiently separating and collecting methane gas from a gas-liquid-solid slurry mixture, while also providing separation of the mineral solids for disposal and reclamation of water for reuse in the drilling operation. No other system known in this art field offers the features and advantages of the present invention.

The present preferred embodiment of the invention is particularly adapted for use in an underground mining environment and the apparatus and operations of the invention are clearly illustrated by this particular application.

However, the adaptation of the present invention to the solution of problems specific to the mining industry is not the only commercial application for the invention. This will become apparent from a reading of the description which follows.

SUMMARY OF THE PRESENT INVENTION

The present invention is a hermetic system for the separation and reclamation of a gas, an aqueous fluid, and solids from a slurry mixture. The system includes an enclosure into which the mixture is deposited. The enclosure is constructed so as to have a substantially airtight interior therein.

To introduce the mixture into the enclosure a trough-like passageway is provided in which the major portion of gas contained in the entering mixture is released and transferred to a collection area and the settlement of solids from the mixture is augmented as the mixture flows through the passageway.

The mixture is deposited from the passageway into the enclosure interior for further separation of the solids, gas and aqueous fluid. Preferably, at least one baffle is positioned near the outlet of the passageway to enhance solids settling. A filter assembly, e.g. a rotating wedge-wire filter, completes the separation of solids from the aqueous fluid of the mixture to achieve the desired degree of fluid clarification.

The separated aqueous fluid is reclaimed from the filter assembly for reuse in the operation, e.g. drilling operation. The settled solids are continuously transported along the enclosure base to an area opposite the filter assembly for removal from the enclosure.

Make-up water is supplied to the system through a high pressure nozzle arrangement positioned within the filter assembly. The release of water by the nozzles not only supplies the necessary make-up water to the system but also provides a cleaning mechanism for the filter of the filter assembly. A control mechanism within the enclosure, but external to the filter assembly, controls the release of make-up water into the system.

A skimmer mechanism is provided to remove floating materials from the surface level within the enclosure. The skimmer mechanism also serves to maintain the necessary head on the progressive cavity pump which is used to remove the separated solids from the enclosure, thus enabling a complete entrapment of the gas or methane within the system.

In the event of surges occurring in the flow of mixture into the enclosure, an emergency overflow outlet mechanism is provided to release the high mixture flows from the system.

These and other features of the invention are all fully explained and a preferred structure for the system is described hereinafter.

DETAILED DESCRIPTION OF A PREFERRED EMBODIMENT OF THE PRESENT INVENTION

In the drawings like reference numerals are used throughout the views to indicate the same element. With reference to FIGS. 1-4 the construction of an enclosure 10 wherein the separation of the slurry mixture occurs may be appreciated. The enclosure 10 is a self-contained environment essentially sealed with respect to the ambient atmosphere surrounding it. Generally rectangular in shape, the enclosure has a first end, defined by a forwardmost wall 11, a second end (opposite the first end) defined by a rearwardmost wall 12, a base 13 having a horizontal, flat portion 14 and an upwardly extending portion 15 in the area of the second end, a cover or top wall 16, and a pair of side walls 17,18 secured to and extending between the base, the cover and the two ends, thus defining an interior area 19 of the enclosure. Various inlets and outlets in the enclosure for the mixture, the separated components of the mixture and other fluid flows are provided. These will be separately described in connection with other features of the invention hereinafter.

Figure 4:
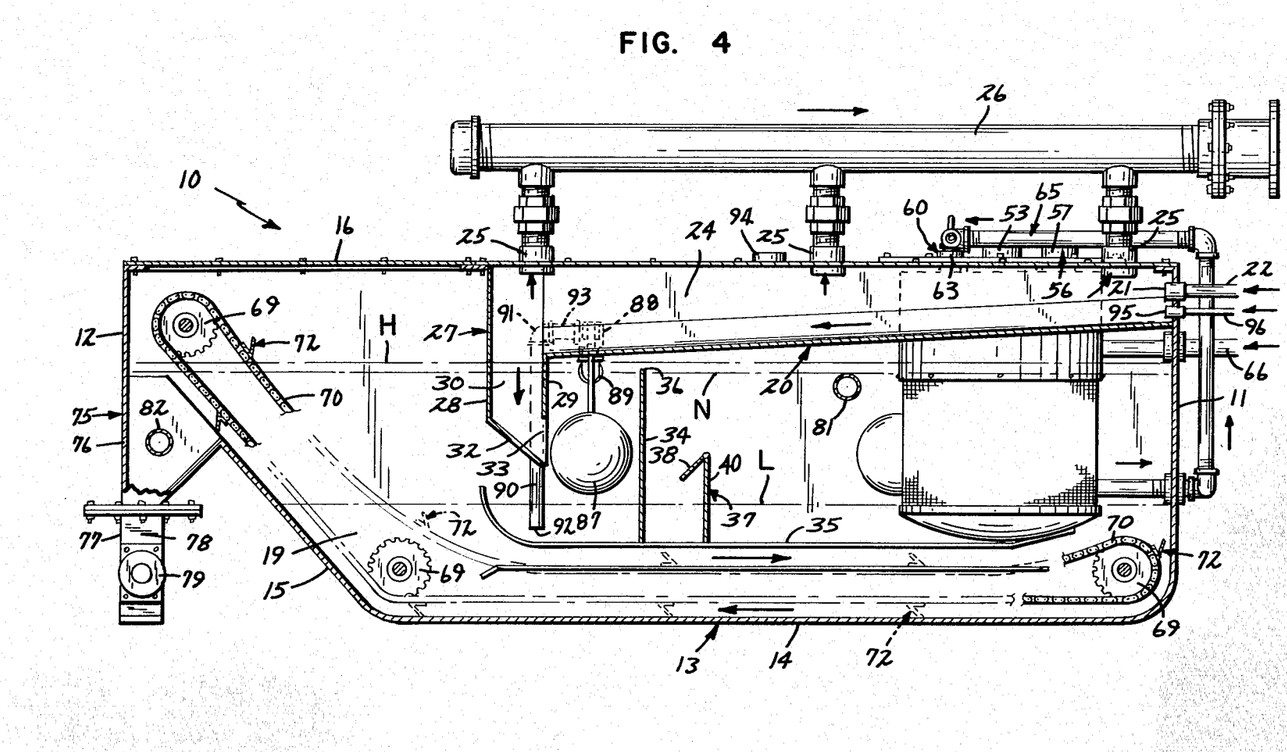
FIG. 4 is a view in cross-section of the present invention as seen generally along lines 4—4 in FIG. 1.
Figure 5:
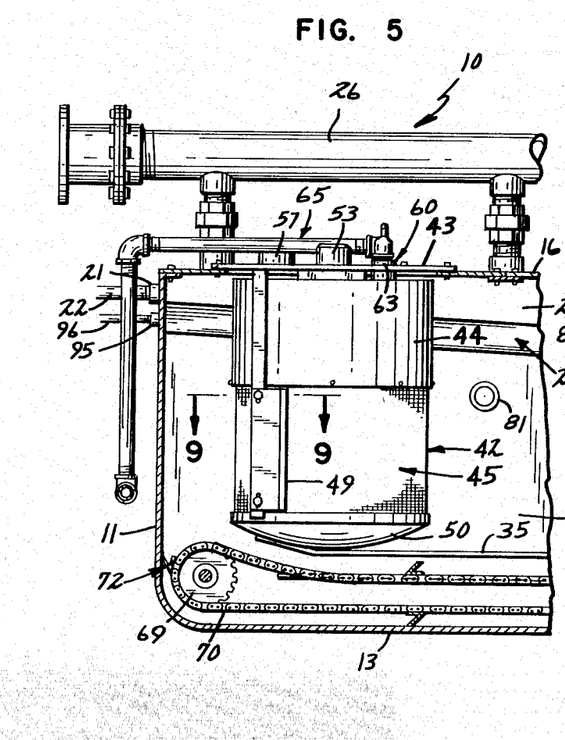
FIG. 5 is a view in cross-section of a portion of the present invention as seen generally along lines 5—5 in FIG. 1.
Figure 6:
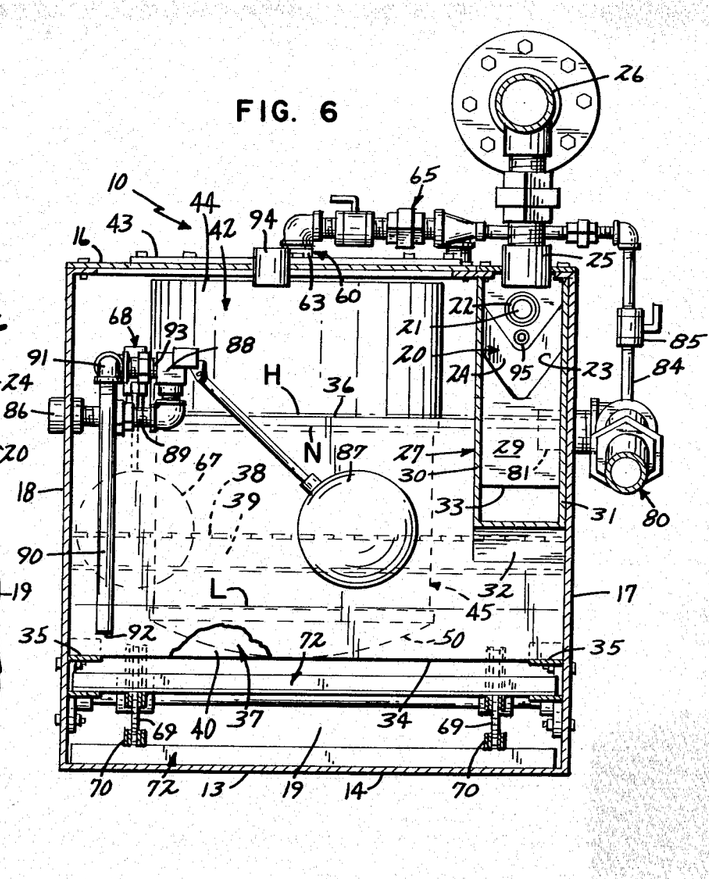
FIG. 6 is a view in cross-section of the present invention as seen generally along lines 6—6 in FIG. 1.

Referring now to FIGS. 4 and 6 the structure provided for the introduction of the slurry mixture containing mineral solids, e.g. coal; a gas, e.g. methane; and a fluid, e.g. water into the enclosure will be described. A troughlike passageway, also referred to hereinafter as a hydraulic trough 20, is positioned within the enclosure 10 along one side wall 18 of the enclosure and near the enclosure cover 16. An inlet opening 21 in the enclosure forwardmost wall 11 feeds the slurry mixture into the system as it arrives via piping 22 from a remote source, e.g. a drill head. The trough 20 is constructed to augment the collection of methane gas and the settlement of solids contained in the mixture. In the preferred embodiment the trough has two side walls 23,24 constructed and arranged to appear substantially V- or U-shape in cross-section. The trough increases in depth along its length from the enclosure first end towards the opposite or second end of the enclosure. Further, the trough 20 is arranged to slope downwardly in the direction of the second end of the enclosure. In the preferred embodiment the uppermost part of the trough is defined by a portion of the enclosure cover 16. A plurality of vents or openings 25 in the cover 16 allow fluid communication between the trough 20 and a conventional gas manifold arrangement 26 mounted above the enclosure 10. The gas manifold arrangement is mounted in sealed relationship with the vents 25. At the end of the trough 20, opposite the trough inlet 21, a downwardly extending chute portion 27 is provided (See FIG. 4) having four vertical parallel walls, 28,29,30,31, a sloping end wall 32 extending in a direction away from the rearwardmost end of the enclosure, and a slurry mixture outlet or opening 33 defined by the lowermost ends of the chute walls 28,29,30,31,32. The mixture outlet 33 directs the entering mixture into the enclosure interior 19 in a direction generally towards the enclosure first end but in a generally downward direction so as to augment the settlement of the solids within the enclosure.

To enhance the settling of the solids contained in the mixture at least one baffle 34 is provided near the slurry trough outlet 33. In the preferred embodiment a pair of supporting members 35, which also serve as flight guides for a dragout assembly, are mounted in the enclosure interior 19 and are used to secure the first baffle 34 in an upright position within the enclosure at a short distance from but directly in front of the trough outlet 33. The first baffle 34 has a height sufficient to place its uppermost or free end above the trough outlet 33 and generally at or near the normal surface level N of the slurry mixture. The baffle 34 is preferably a solid member and extends the full width of the enclosure interior with a bottom edge of its free lowermost end positioned a distance from the enclosure base. In the preferred embodiment a second baffle 37 is provided at a location intermediate the first baffle 34 and the first or forwardmost end of the enclosure. The second baffle 37 also extends upwardly into the enclosure interior from the support members 35. However, at its uppermost or free end a hinge 38 is provided to which is secured a plate member 39 whose angle with respect to the vertical portion 40 of the second baffle 37 may be adjusted. The height of the second baffle 37 is preferably approximately half the height of the first baffle 34. As with the first baffle 34, the second baffle 37 also has a free lowermost end having a bottom edge positioned a distance from the enclosure base.

Positioned near the first end or forwardmost wall 11 of the enclosure 10 is a filter assembly 42 which provides absolute filtering of the slurry mixture. In the preferred embodiment a conventional, rotatable wedge-wire, cylindrical, filter assembly 42 is chosen. With reference specifically to FIGS. 1, 4-7 and 9 the position of the assembly within the enclosure and its construction may be described. The assembly 42 has a top 43 which is secured to a portion of the enclosure cover 16 and thus suspends the assembly 42 within the enclosure 10. The uppermost portion of the assembly, that portion which normally extends above the fluid level within the enclosure, is a solid, endless wall 44. Extending below and secured to the lowermost perimeter of the solid wall 44 is a wedge-wire screen 45 arranged also as an endless wall. As can be appreciated from FIG. 9, the wedge-wire screen wall is a filter composed of a continuous series of wedge-shaped wires 46. Each wire has a triangular shaped cross-section. The bases 47 of these triangular cross-sectional wires are aligned relative to each other but spaced apart a given distance, e.g. thirty microns, to provide the openings of the filter. The apex 48 of each wire extends radially inward of the assembly interior. A stationary scraping mechanism 49, e.g. a doctor blade, is mounted exterior to the assembly directly adjacent the wedge-wire screen wall 45 (See FIGS. 5 and 9). As the assembly 42 rotates, the screen wall 45 is continuously cleaned of solids buildup by the scrapping mechanism 49. If desired, a wire brush (not shown) may also be mounted in combination with the doctor blade. The bottom portion 50 of the cylindrical assembly in the preferred embodiment is a dish-shaped solid member secured to the lowermost end of the wedge-wire screen wall 45. Together the assembly top 43, walls 44, 45 and bottom portion 50 define a generally open interior area 51 of the assembly 42.

Figures 7, 8, 9:
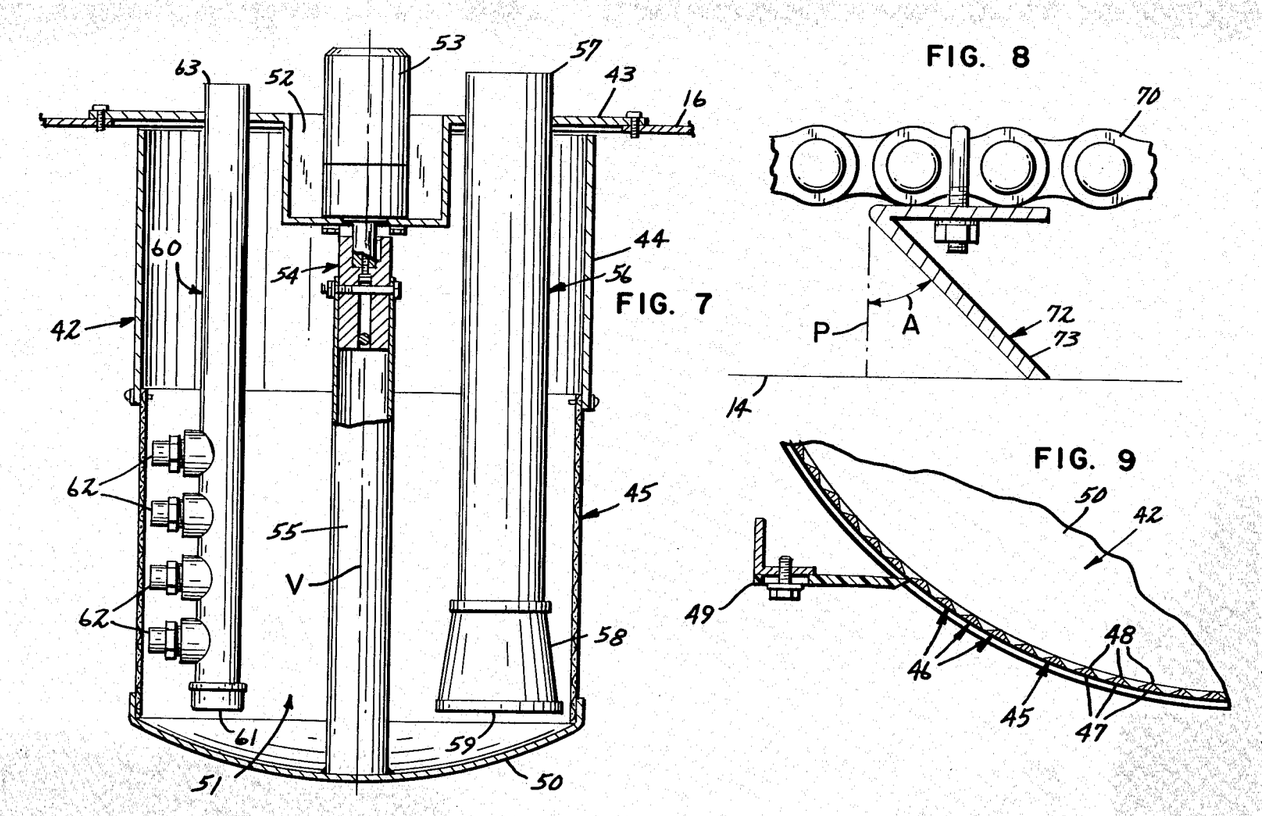
FIG. 7 is a view in cross-section of a portion of the present invention as seen generally along lines 7—7 in FIG. 1.
FIG. 8 is an enlarged view of a portion of the solids dragout mechanism of the present invention.
FIG. 9 is a view in cross-section of a portion of the present invention as seen generally along lines 9—9 in FIG. 5.

As shown in FIG. 7, the assembly top 43 is constructed so as to be permanently secured in a stationary manner with respect to the enclosure. The solid and screen walls 44,45 respectively, as well as the bottom 50 of the assembly 42, are constructed and arranged in a conventional manner so as to be rotatable with respect to the assembly top 43. The assembly top 43 is provided with a centrally located cavity area 52 into which a hydraulic motor 53 is positioned and mounted. A conventional coupling arrangement 54 between the motor 53 and a shaft 55 which extends to the cylinder bottom 50 and is securely fastened thereto, allows the filter assembly to be rotated about a vertical axis V coincident with the axis of the shaft. To one side of the shaft 55 and within the filter assembly interior 51, a pipe 56 is provided having a first uppermost end 57 sealed with and extending through the assembly top 43 as well as the enclosure cover 16. This end 57 is in sealed, fluid communication with a fluid conduit, not shown, which returns clean fluid from the system's filter assembly interior to a location remote from the system, e.g. a drill bit head. At the opposite end of the pipe 56 is a conventional bell-reducer 58 having an open end 59 which allows fluid flow between the filter assembly interor 51 and the pipe 56. Adjacent the other side of the motor and shaft arrangement, a second pipe 60 is located. This second pipe 60 extends substantially the full height of the filter assembly and has a first closed end 61 near the assembly bottom 50. Mounted in spaced-apart, aligned relationship along a portion of the second pipe 60 and directly adjacent the wedge-wire screen wall 45 is a plurality of conventional, high-pressure nozzles 62. The uppermost end 63 of the second pipe 60 is in sealed relationship and extends above the assembly top 43 and enclosure cover 16 and is sealingly connected to a second fluid conduit 65.

Referring now to FIGS. 1-6 the construction and arrangement of the second fluid conduit 65 may be described. The second fluid conduit has a first end or inlet 66 in the forwardmost wall 11 of the enclosure 10. The inlet 66 is in fluid communication with a remote source of water (not shown) which is pumped under pressure to the system of the present invention. The remote source of water may be a municipal water line. A series of interconnected pipes connect the inlet 66 to the uppermost end 63 of the second pipe 60 for introducing a supply of make-up water therein and thus into the assembly 42 and the enclosure 10 via the high-pressure nozzles 62. The construction of this series of pipes is conventional and need not be explained in further detail to one skilled in the art.

Figure 1:
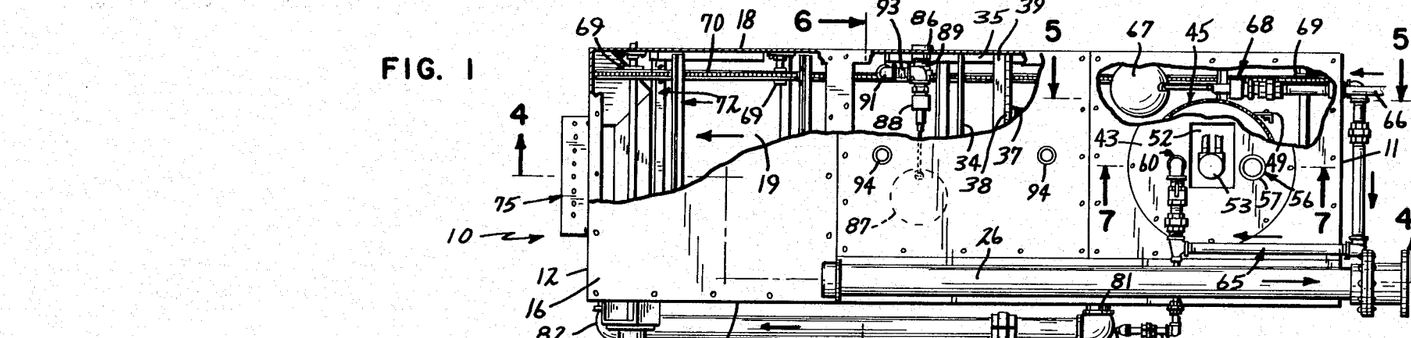
FIG. 1 is a top plan view of a preferred embodiment of the present invention with portions broken away to show the interior thereof.
Figures 2, 3:
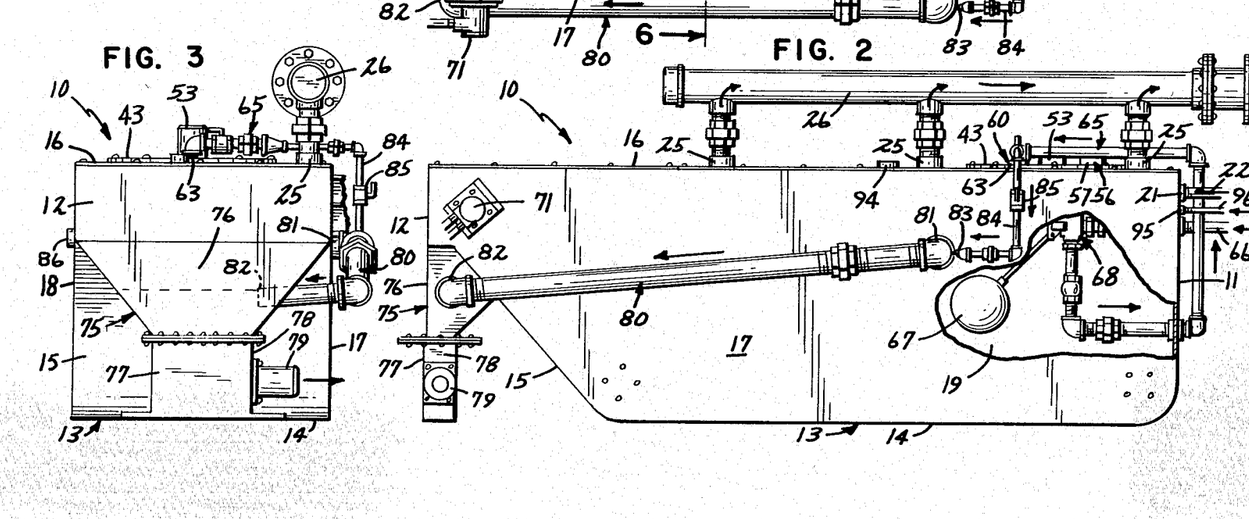
FIG. 2 is a side view in elevation of the preferred embodiment of the present invention in FIG. 1.
FIG. 3 is an end view in elevation of the preferred embodiment of the present invention as seen from left to right in FIG. 2.

To control the flow of water from the remote source to the filter assembly interior 51 a conventional float 67 and high pressure valve 68 are provided within the enclosure but exterior to the filter assembly. In FIGS. 1 and 2 a preferred float-valve arrangement is illustrated. The float 67 automatically opens a high-pressure valve 68, which is positioned in one of the pipes of the make-up water conduit 65, whenever the level of fluid within the enclosure 10 drops to a pre-determined low-level L. (See FIG. 4). The opened valve 68 allows the pressurized water supply from the remote source to flow through the second conduit 65 into the second pipe 60, where it is released into the system through the nozzles 62.

For the removal of mineral solids which settle to the enclosure base 13, a solids dragout assembly is provided. Except for the design of the individual flights, the construction of the dragout assembly is conventional and thus will not be described in extensive detail. As can be seen from FIGS. 1 and 4-6, the dragout assembly is arranged along the base 13 and the second end of the enclosure. Conventional sprockets 69, a pair of endless chains 70 and a motor 71 are provided to move the dragout flights 72 in a manner such that the solids on the enclosure base are continuously dragged or transported from the first end to the second end. (See FIG. 4). In FIG. 8 an enlarged side elevational view of one representative flight 72 is shown. The flight 72 is specially designed to have an inclined portion 73 positioned at an angle A, preferably from 35 to 45 degrees with respect to a vertical plane P. As can be seen from FIG. 4, the flights 72 pass along the full length of the enclosure base 13.

At the rearwardmost end of the enclosure 10 a hopper 75 is provided having an upper truncated or trapezoidal shaped portion 76 and a lower rectangular shaped portion 77. The upper portion 76 is constructed to receive solids from the dragout assembly and to contain a volume of fluid therein at all times during the operation of the system. The lower portion 77 of the hopper 75 is in fluid communication with the upper portion 76. In one wall 78 of the lower portion a conventional progressive cavity pump 79 is sealingly mounted. Through the pump 79 the solids are removed from the system to a remote location (not shown) for disposal.

To maintain a sufficient head of fluid on the pump 79 and thus to avoid releasing gas into the environment via the pump discharge and to skim floating solids at the surface level of the fluid within the enclosure 10, a skimmer mechanism is provided. In the preferred embodiment a pipe 80 is secured exterior to one of the walls, e.g. 17, of the enclosure 10. The pipe 80 has an upper open end 81 extending through the enclosure wall 17, generally at the location of the normal fluid level N within the enclosure 10. A lowermost end 82 of the pipe 80 deposits the skimmed fluid into the upper portion 76 of the hopper 75. Both ends 81,82 of the pipe are secured to the enclosure in a conventional sealed manner.

To flush and clean the length of the skimmer pipe 80 a flushing nozzle 83 is inserted into the pipe at the pipe's uppermost end 81. The nozzle 83 is connected by standard piping 84 to the second fluid conduit 65 which provides the system's supply of make-up water. See FIGS. 1-3 and 6. A manually-controlled conventional valve 85 positioned in the pipe 84 releases the flow of water under-pressure into the skimmer pipe 80 when the valve 85 is open. Normally the valve 85 is closed.

To handle surges of fluid mixture into the system which cannot otherwise be controlled, an emergency fluid outlet 86 is provided. Referring now to FIGS. 1 and 6, the emergency fluid outlet 86 is located in a side wall 18 of the enclosure 10, opposite the skimmer pipe 80. The outlet is above the normal fluid level N in the enclosure. To prevent the escape of methane gas from the emergency outlet 86, a float 87, valve 88 and an arrangement of pipes are connected to the emergency outlet. In FIG. 6 it can be seen that a horizontal pipe 89 extends inward from the emergency outlet 86. Connected at the end of this pipe 89, opposite the emergency outlet 86, is a conventional valve 88 to which a conventional float 87 is operatively connected. Also connected to the valve 88 is a vertically oriented pipe 90 having an upper end 91 in fluid communication with the valve 88, as at 93, and a lower open end 92 which is submerged not only below the normal level N of fluid, but also below the pre-determined low-level L of fluid. The emergency high-level valve, while normally closed, is constructed to automatically open when the float 87 is raised to a pre-determined high-level H by the fluid in the enclosure 10.

OPERATION OF THE PREFERRED EMBODIMENT

The system of the present invention is unique in its ability to maintain a hermetic or sealed environment for the separation and reclamation of a gas, solids and a liquid from a slurry mixture. For purposes of discussion only, the operation of the preferred embodiment will be described for a slurry mixture comprised of coal particles, water and methane gas. It is appreciated by those skilled in the art that this system may function in a variety of applications and is thus not limited solely to the coal-slurry application of the preferred embodiment.

Referring again to the drawings, where throughout arrows are provided to illustrate the various directions of flow within the system, and in particular to FIG. 4, the movement of the slurry-mixture through the system and the operation of the system will be described. The mixture enters the system at the trough inlet 21. As the mixture flows in a generally downward direction within the trough 20, free methane gas within the mixture is released. The released gas is contained by the trough 20 and vented from the enclosure 10 via the vents or openings 25. The gas passes into the manifold arrangement 26 where it is removed to a remote location and collected for commercial sale or other use. It is believed that at least ninety-five percent of the methane gas contained in the mixture will be separated from the mixture within the trough. The remaining five percent of gas entrapped in coal solid fines is released in the enclosure interior outside the trough and vented through a second set of vents 94 in the enclosure cover 16 to a second manifold (not shown) for collection.

As gas is released from the accelerating flow of mixture in the trough 20, the V-shaped or tapered construction of the trough bottom augments the separation of the solids from the mixture liquid. The trough 20 is essentially self-cleaning as a result; however, it is preferable to provide a high-pressure nozzle 95 at the inlet end of the trough for periodic flushing of the trough in order to dislodge any chunks of coal which may become wedged at the bottom of the trough. The nozzle 95 is connected by pipe 96 to the make-up water supply and is controlled by a manually operated valve, not shown, but contained in pipe 96.

When the slurry flow reaches the end of the sloping length of the trough 20 the direction of the flow changes abruptly as the flow reaches the release chute 27 and is deposited into the enclosure interior 19 via the chute outlet 33. An important feature of this invention is the release of the slurry mixture, which is at this point essentially free of methane gas, near the area of the enclosure where the solids are removed. Maximum settlement of solids will occur in the area where the mixture is initially released from the trough. As this is closest to the solids outlet area, demand on the remainder of the system, e.g. the baffles and filter assembly, will be less and filtering efficiency is enhanced. Solids settling to the enclosure base 13 below the trough chute 27 are then picked up by the continuously operating dragout assembly and thus removed from the enclosure in as short a time as possible after the mixture enters the enclosure.

Settlement of the solids is further enhanced as the mixture flows under the bottom edge of the first baffle 34 and then passes under the bottom edge, as well as along and over the inclined plate member 39, of the second baffle 37. The sloped plate 39 of the second baffle 37 collects migrating fines, agglomerates them apart from the fluid flow in the area defined below and between the vertical portion 40 and the adjustable sloped plate 39 of the second baffle 37. The agglomerated fines eventually settle by force of gravity to the enclosure base where they are then removed from the system via the dragout assembly.

Fines which remain suspended in the liquid of the mixture passing the baffles 34, 37 are then separated out by the rotating wedge-wire filter assembly 42.

Referring now to FIGS. 7 and 9, as the mixture is drawn into the rotating assembly 42 particles of coal larger than the openings between the individual wire wedges 46 are separated from the flow. The screen 45 serves as a filter and depending on the screen design various degrees of fluid clarity may be obtained. For example, in the particular application of the preferred embodiment the desirable clarity may be clean water which contains particles no greater than 30 microns in size. This type of filtration is referred to as being absolute and provides a significant advantage over known prior art systems where the clarity of the reclaimed water cannot be consistently maintained. The clarified mixture portion, i.e. water plus solids of a size less than the filter openings in the wedge wire screen, passing into the filter assembly interior 51 is removed from the system via the first pipe 56 and reclaimed for reuse upstream of the system, e.g. in a drill-bit head.

It is desirable to maintain a certain level of fluid within the enclosure during system operation. In order to do so, make-up water may be added whenever the fluid level drops below a pre-determined low level L. In the present invention the make-up water is supplied in a manner which accomplishes two functions: (1) the desired normal-operating, fluid level is maintained within the system and (2) the rotating filter screen is cleaned of solids buildup. Introduction of the make-up water through the pressure nozzles 62 allows the filter assembly to be regularly cleaned by the jet sprays and thereby maintain the operating efficiency of the filter assembly. As noted above, the float-valve arrangement opens and closes the valve 68 in the make-up water supply line as dictated whenever the mixture is at the pre-selected low-level within the enclosure.

The desired operating efficiency of the filter assembly is also maintained by the continuous cleaning of the outside surface of the screen 45 by the doctor blade scraping mechanism. The scraping mechanism 49 removes solids buildup on this surfce. The water released under pressure in the assembly interior via nozzles 62 cleans the screen 45 and also pushes floating solids and other material away from the filter assembly allowing such to be skimmed from the enclosure by the skimmer pipe 80.

The mixture solids, not removed by settlement nor by the filter assembly, are removed by fluid displacement of the surface of the mixture skimmed by the pipe 80. As with the jet-spray nozzles 62, this pipe also serves a dual function. Not only does it skim the floating solid material and remove it from the enclosure interior but in doing so it provides a source of fluid to the solids collection hopper 75 to insure that the necessary fluid head is maintained on the progressive cavity pump 79. This is important so that no methane gas escapes the enclosure 10 via the operating pump 79.

The skimmer pipe 80 is periodically cleaned by flushing it with a high-pressure release of make-up water supplied from the nozzle 82 at the upper end 81 of the pipe 80. An operator manually opens the valve 85 to achieve the flushing action.

While separation is continuously occurring in the enclosure 10, the dragout assembly is continuously operated. The sloped or angled design of the dragout flights 72 enhances the removal of the settled solids in that relatively large bulk coal particles are carried along in front of the inclined flight portion for release into the hopper 75. The angle of the flight 72 eliminates the need for flight scrapers. The buildup of solids along the moving flight member 73 drops into the hopper by the force of gravity as the flight passes the upper edge of the base portion 15 to a point above the upper hopper portion 76.

In the event an unexpected surge occurs in which the slurry mixture enters the enclosure in a volume which cannot be processed readily, the emergency float valve 88 is lifted by the rising mixture level. When the predetermined high level H of the mixture is reached the emergency outlet valve 88 automatically opens to allow the mixture to flow from the outlet 86 and thus prevent damage to the system. Under normal operating conditions the outlet 86 is sealed or otherwise closed so as not to release any methane gas therethrough. In the preferred embodiment the vertical pipe 90 extending into the fluid contained in the enclosure fluidically seals the outlet 86 from releasing gas therethrough.

As can now be appreciated the present invention is an advance in the state of the art for the separation and reclamation of a gas, a liquid and mineral solids from a slurry mixture. The separation and reclamation occur in a sealed environment and with an efficiency unknown in the prior art. The structure of the system is unique and allows a valuable but potentially explosive gas, i.e. methane gas, to be safely recovered, collected and then sold to an end user. Furthermore, water used to operate the drill bit is reclaimed and reused thereby decreasing significantly the demand for such resources. Also coal fines or mineral solids are harvested in a semi-dry state. Another advantage of the invention over the prior art is that one part of the system need not be shut down in order to operate another part of the system, thus saving valuable time and requiring less attention from operators. With the cleaning nozzles variously located throughout the system and the provision of a high-level emergency outlet the system continues to function even under extremely adverse conditions in a manner not possible with the known prior art systems.

What is claimed is:

1. A hermetic system for the separation and reclamation of a gas, an aqueous fluid, and solids from a slurry mixture, said system comprising:

an enclosure for a mixture of gas, aqueous fluid and solids, said enclosure being constructed and arranged to create a substantially hermetic interior therein;

inlet means in said enclosure for releasing the mixture into said enclosure interior along a defined passageway, with gas released by the mixture contained therein and solids settlement being augmented therein;

means, in said enclosure, for venting gas released from the mixture to a first location remote from said enclosure;

means, in said enclosure interior, for separating solids from the mixture, said separating means including baffle means for augmenting settling of solids downwardly and a filter assembly constructed and arranged to separate and reclaim an aqueous fluid from the mixture;

outlet means, connected to said filter assembly, for releasing the reclaimed aqueous fluid from said enclosure apart from the gas and for transferring the fluid to a second remote location;

solids dragout means positioned along a lowermost portion of said enclosure for transferring settled solids from said enclosure, said dragout means including means for releasing the solids from said enclosure to a third remote location;

means for introducing a supply of make-up water into said enclosure through said filter assembly;

means in said enclosure for controlling the supply of make-up water, said means including means external to said filter assembly for determining the surface level of the mixture contained in said enclosure;

means, in said enclosure, for skimming the surface level of the mixture contained in said enclosure, said means being external to said filter assembly;

means, connected to said skimming means, for transferring the skimmed mixture portion to said solids releasing means; and mixture outlet means, in said enclosure for releasing a portion of the mixture from said enclosure interior when a pre-determined level of mixture contained in said enclosure is reached, said mixture outlet means including means for determining when said pre-determined level has been reached.

2. The separation and reclamation system according to claim 1 wherein said enclosure has a first end, a second end opposite said first end, a cover, a base, and at least one side wall extending between said ends, said cover and said base defining said enclosure interior therein, said mixture inlet means including a trough extending within said enclosure from said first end to a location proximate said second end, said trough being in fluid communication with said gas venting means and being constructed and arranged so as to augment the velocity of the mixture as it travels therethrough, said trough including an outlet proximate said enclosure second end for releasing the mixture into said enclosure interior in a direction generally towards said baffle means and said enclosure base.

3. The separation and reclamation system of claim 2 wherein said gas venting means includes a gas manifold arrangement external to said enclosure, a plurality of openings in said cover communicating with said trough, and at least one vent in said cover external to said trough, said plurality of openings being connected in a sealed manner to said gas manifold for transferring gas from said enclosure to said manifold.

4. The separation and reclamation system of claim 2 wherein said baffle means includes a first baffle adjacent said trough outlet and extending upwardly into said enclosure interior from said enclosure base and a second baffle plate, spaced apart from and located intermediate said filter assembly and said first baffle plate, secured to said enclosure base and extending generally upwardly therefrom, said baffle plates being constructed and arranged to cause the mixture to flow in a defined path from said trough outlet to said filter assembly.

5. The separation and reclamation system according to claim 2 wherein said solids dragout means includes a dragout assembly positioned along said enclosure base and means for driving said assembly in a direction such that movement of the settled solids is from said enclosure first end to said enclosure second end, with said solids releasing means includes a hopper for receiving solids from said dragout assembly and pump means for transferring solids from said hopper to a location external to said enclosure.

6. The separation and reclamation system according to claim 1 wherein said filter assembly includes a rotating filter positioned near said enclosure first end, said filter having a generally hollow interior and means for rotating said filter within the mixture, with said reclaimed aqueous fluid outlet means having a first end positioned within said filter interior and a second end extending from said enclosure.

7. The separation and reclamation system according to claim 6 wherein said means for supplying the make-up water includes first conduit means for transferring make-up water to said filter interior, high pressure nozzle means for cleaning said filter with the make-up water discharged into said enclosure, and second conduit means for supplying a portion of the make-up water to said means for transferring the skimmed mixture portion to said solids releasing means.

8. The separation and reclamation system according to claim 7 wherein said skimming means includes a pipe positioned along said enclosure side wall at a predetermined location which allows the mixture surface level to be skimmed by fluid displacement from said enclosure interior into said pipe, said pipe having a first open end in communication with said enclosure interior, a portion external to said enclosure and a second open end opposite said first end, said second end being in communication with said dragout solids releasing means with said pipe transferring the skimmed mixture portion to said solids releasing means at said enclosure second end.

9. The separation and reclamation system according to claim 2 wherein said mixture outlet means includes an outlet in said enclosure and a float-valve arrangement connected to said outlet, said float valve arrangement including a float mechanism constructed and arranged to determine the fluid level within said enclosure at any given time and a valve mechanism constructed and arranged to control the flow of mixture from said enclosure through said outlet.

10. A hermetic system for the separation and reclamation of a gas, an aqueous fluid, and solids from a slurry mixture, said system comprising:

an enclosure for a mixture of gas, aqueous fluid and solids, said enclosure being constructed and arranged to create a substantially airtight interior therein;

inlet means, in said enclosure for releasing the mixture into said enclosure interior, said inlet means including a passageway constructed and arranged to contain gas released by the mixture and to augment settling of the solids in the mixture;

means, in said enclosure, for venting gas released from the mixture to a first location remote from said enclosure, said venting means including openings in communication with said inlet means trough;

means, in said enclosure interior, for separating solids from the mixture, said separating means including baffle means for augmenting settling of solids downwardly and a filter assembly constructed and arranged to separate and reclaim an aqueous fluid from the mixture and to separate solids from the mixture and augment the settlement thereof within said enclosure;

outlet means, connected to said filter assembly, for releasing the reclaimed aqueous fluid from said enclosure and for transferring the fluid to a second remote location;

solids dragout means positioned along a lowermost portion of said enclosure for transferring settled solids from said enclosure, said dragout means including means for releasing the solids from said enclosure to a third remote location;

means for supplying a source of make-up water to said filter assembly for release into said enclosure;

means, in said enclosure external to said filter assembly for controlling the release of make-up water into said filter assembly, said means including means for determining when the surface level of the mixture contained in said enclosure has reached a pre-determined low level;

means for skimming the surface level of the mixture within said enclosure, said skimming means being in fluid communication with said enclosure interior and including means external to said enclosure for transferring the skimmed mixture portion to said solids releasing means; and mixture outlet means, in said enclosure for releasing a portion of the mixture from said enclosure interior when a pre-determined mixture capacity for said enclosure is reached, said mixture outlet means including means for determining when said predetermined capacity has been reached and means preventing release of gas therethrough.

* * * * *